United States Patent [19]
Kuczynski et al.

[11] Patent Number: 5,989,699
[45] Date of Patent: Nov. 23, 1999

[54] FOAM COMPOSITE MATERIAL COMPRISING A FIRST FOAM HAVING AN UNCONTOURED SURFACE, AND A SECOND, DIFFERENT FOAM FIXED TO THE FIRST FOAM AT ITS UNCONTOURED SURFACE

[75] Inventors: Edward T. Kuczynski, Troy, Mich.; Ian L. Hughes, Windsor, Canada; Charles R. Burchi, Commerce, Mich.

[73] Assignee: Woodbridge Foam Corporation, Canada

[21] Appl. No.: 08/980,802

[22] Filed: Dec. 1, 1997

[51] Int. Cl.[6] ............................... B32B 3/26; B32C 67/20
[52] U.S. Cl. .................. 428/316.6; 428/67; 428/217; 264/46.6
[58] Field of Search ..................... 428/316.6, 304.4, 428/212, 217, 67, 71; 264/46.6

[56] References Cited

U.S. PATENT DOCUMENTS

| | | |
|---|---|---|
| 4,873,036 | 10/1989 | Urai . |
| 5,176,860 | 1/1993 | Storch . |
| 5,389,316 | 2/1995 | Kerman . |
| 5,542,747 | 8/1996 | Burchi . |
| 5,571,355 | 11/1996 | Kornylo . |
| 5,837,172 | 11/1998 | Prichard et al. . |

*Primary Examiner*—Deborah Jones
*Assistant Examiner*—Jason Savage
*Attorney, Agent, or Firm*—Fitzpatrick, Cella, Harper & Scinto

[57] ABSTRACT

A foam composite material comprising a first isocyanate-based polymer foam comprising at least one uncontoured surface and a second, molded isocyanate-based polymer foam, the first isocyanate-based polymer foam and the second isocyanate-based polymer foam being: (i) of different composition, and (ii) fixed with respect to one another. A process for producing the foam composite material also disclosed. The foam composite material is useful in another of vehicular and non-vehicular applications.

40 Claims, 5 Drawing Sheets

FOAM COMPOSITE MATERIAL COMPRISING A FIRST FOAM HAVING AN UNCONTOURED SURFACE, AND A SECOND, DIFFERENT FOAM FIXED TO THE FIRST FOAM AT ITS UNCONTOURED SURFACE

BACKGROUND OF THE INVENTION

1. Field of the Invention

In one of its aspects, the present invention relates to a foam composite material, preferably in the form of a seat. In another of its aspects, the present invention relates to a process for producing a foam composite material, preferably in the form of a seat.

2. Description of the Prior Art

Passenger seats in vehicles, such as automobiles, are typically fabricated from a foam (usually polyurethane) material which is molded into the desired shape and covered with an appropriate trim cover. The foamed material is selected to provide passenger comfort by providing a resilient seat and the trim cover is selected to provide the desired aesthetic properties.

To meet desired safety standards, passenger seats in vehicles such as automobiles now often provide anti-"submarine" properties. Submarining is the term used to describe the tendency of the pelvis of a seated passenger to move forward and down during a collision. When the passenger is wearing a shoulder harness or lap type seatbelt, this tendency can result in the seatbelt strangling the passenger with potentially fatal consequences. Accordingly, it is known in the art to design passenger seats with anti-submarine properties. These properties may be provided by rigid or semi-rigid members embedded in the seat and which provide additional pelvic support to the passenger during a collision. To function properly, these members cannot move and thus, must be fixed (directly or indirectly) to the vehicle.

It is also known in the art that, while the resiliency of the foamed material in the seat provides passenger comfort, it does not provide the necessary structural strength for the seat. This necessitates additional reinforcement of the seat to provide the degree of structural strength required to ensure proper mounting of the seat within the vehicle and proper support of anti-submarine elements. Accordingly, prior art vehicular seats typically include a perimeter frame of metal which strengthens the seat. Further, support rails are typically mounted across the metal frame to stiffen the frame and to provide a suitable attachment point for the means used to anchor the seat to the vehicle. Conventionally, the metal frame and/or support rails are substantially completely embedded in the foam material when the seat is molded. In many cases, the metal frame will further comprise a plurality of apertures or other means for attaching a trim cover to the seat.

Of course, the requirement for such a perimeter metal frame and for support rails adds to the cost of manufacturing the seat and, more importantly, adds to the weight of the seat and the overall weight of the vehicle in which it is installed. This added weight increases both the cost of shipping the seat to the vehicle manufacturer and the eventual lifetime operating expense for the vehicle. Finally, the presence of metal frame and support rails or other components in the seat hampers the eventual recycling of the seat materials which is becoming increasingly important in today's environmentally concerned marketplace.

U.S. Pat. Nos. 5,400,490 [Burchi] and 5,542,747 [Burchi], issued Mar. 28, 1995 and Aug. 6, 1996, respectively, the contents of each of which are hereby incorporated by reference, describe a passenger seat comprising a frame element molded from relatively high density, rigid foam; vehicle anchorage means connected to the frame element; and a seat body comprising a resilient material fixed with respect to the frame element. The provision of a frame element molded from relatively high density, rigid foam obviates the need for a conventional metal frame. The '490 and '747 patents also teach application of a trim cover to passenger seat. The trim cover may be attached using push pins or a combination of bottom flaps (see FIGS. 3 and 9 in the '490 and '747 patents) with conventional mechanical attachment means (e.g., Velcro™, J-retainers or push pins).

While the invention taught in the '490 and '747 patents represents a significant advance in the art, there is still room for improvement. One such area is in the attachment of the trim cover to the passenger seat. Specifically, in certain cases, for a number of reasons, it can be advantageous to avoid the use of push pins to attach the trim cover as taught in the '490 and '747 patents. First, the trim cover may have to be pre-drilled or otherwise pretreated to permit penetration of the push pins, involving additional manufacturing cost (this is especially true for trim covers made of an impermeable material such as vinyl or leather). Second, a large number of push pins is required to adequately secure the trim cover to the relatively high density, rigid foam frame, involving additional manufacturing cost, both in materials and labour. Third, the trim cover must be correctly positioned over the resilient material and the relatively high density, rigid foam frame independently of placement of the push pins, increasing the likelihood for improper placement and attachment of the trim cover.

One area of improvement is disclosed in copending U.S. patent application Ser. Nos. 08/706,427, 08/706,431, 08/706,432 and 08/706,433 (each naming Burchi et al. as applicants), each filed on Aug. 30, 1996 and the contents of each of which is hereby incorporated by reference. Specifically, these copending applications set forth an improved system for connecting the trim cover to the rigid foam frame element, and a mold and process for production of an improved seat system.

One area where further improvement would be desirable in this art is in the capital requirements needed and efficiency possible in producing the seat specifically illustrated in the '490 and '747 patents. In particular, both the rigid foam frame element and the resilient foam are molded in the specific embodiment illustrated in the '490 and '747 patents. As will be appreciated by those of skill in the art, if one were to produce this seat on a commercial scale, two molds would be required for each seat—i.e., one mold to produce the rigid foam frame element and one mold in which: (i) the rigid foam frame element is placed, and (ii) the resilient foam is expanded, to produce the final foam product. This requirement results in a significant increase in the capital requirements need two purchase additional molds. Further, the need to conduct two independent molding operations results in a 50% reduction in manufacturing efficiency (i.e., compared to a single molding operation in which a metal frame is embedded in the foam).

Thus, notwithstanding the above-mentioned advances in the art, there continues to remain room for improvement.

Therefore, it would be desirable to have a process for producing a foam composite material, such as the seat specifically illustrated in the '490 and '747 patents which overcomes the need for the use of two molds to produce the final foam product.

SUMMARY OF THE INVENTION

It is an object of the present invention to provide a novel foam composite which obviates or mitigates at least one of the above-mentioned deficiencies of the prior art.

It is another object of the present invention to provide a novel process for producing such a foam composite.

It is yet another object of the present invention to provide a novel seat which obviates or mitigates at least one of the above-mentioned deficiencies of the prior art.

It is another object of the present invention to provide a novel process for producing such a seat.

Accordingly, in one of its embodiments, the present invention provides a foam composite material comprising a first isocyanate-based polymer foam comprising at least one uncontoured surface and a second molded material, the first isocyanate-based polymer foam and the second molded material being: (i) of different composition, and (ii) fixed with respect to one another.

In another of its embodiments, the present invention provides a process for producing a foam composite material in a mold comprising a first mold half and a second mold half engageable to define a mold cavity, the process comprising the steps of:

(i) providing a first isocyanate-based polymer foam having at least one uncontoured surface in the first mold half;

(ii) dispensing a second moldable composition in at least one of the first mold half and the second mold half;

(iii) closing the first mold half and the second mold half;

(iv) molding and curing the second moldable composition to produce the second molded material such that the combination of the first isocyanate-based polymer foam and second molded material substantially fill the mold cavity;

(v) fixing the second molded material with respect to the first isocyanate based foam to produce the foam composite.

In its broadest respects, the present foam composite material is the combination of a first isocyanate-based polymer foam material and a second molded material. The second molded material is not particularly restricted and may be selected from the group comprising foam, horsehair and polyester. Preferably, the second molded material is a foam, most preferably an isocyanate-based polymer foam of different composition than the first isocyanate-based polymer foam of the foam composite.

Thus, in this preferred aspect, the present invention provides a foam composite material comprising a first isocyanate-based polymer foam comprising at least one uncontoured surface and a second, molded isocyanate-based polymer foam, the first isocyanate-based polymer foam and the second isocyanate-based polymer foam being: (i) of different composition, and (ii) fixed with respect to one another.

Further, in this preferred aspect, the present invention provides a process for producing a foam composite material in a mold comprising a first mold half and a second mold half engageable to define a mold cavity, the process comprising the steps of:

(i) providing a first isocyanate-based polymer foam having at least one uncontoured surface in the first mold half;

(ii) dispensing a second foamable composition in at least one of the first mold half and the second mold half;

(iii) closing the first mold half and the second mold half;

(iv) expanding the second foamable polymeric composition to fill substantially the mold cavity to produce a second isocyanate-based molded polymer foam;

(v) fixing the second isocyanate-based polymer foam with respect to the first isocyanate based foam to produce the foam composite.

In one of its more preferred embodiments, the present invention provides a seat comprising: (i) a frame element comprised of a first isocyanate-based polymer rigid foam frame element comprising at least one uncontoured surface, (ii) vehicle anchorage means connected to the frame element, and (iii) a seat body comprised of a second, molded isocyanate-based polymer resilient foam fixed with respect to the frame element.

In another of its more preferred embodiments, the present invention provides a process for producing a seat in a mold comprising a first mold half and a second mold half engageable to define a mold cavity, the process comprising the steps of:

(i) producing a first isocyanate-based polymer foam having at least one uncontoured surface in the first mold half;

(ii) dispensing a liquid foamable polymeric composition in at least one of the first mold half and the second mold half;

(iii) closing the first mold half and the second mold half;

(iv) expanding the liquid foamable polymeric composition to fill substantially the mold cavity to produce a second isocyanate-based polymer foam;

(v) fixing the second isocyanate-based polymer foam with respect to the first isocyanate based foam to produce the foam composite.

Thus, the present inventors have discovered a process by which a foam composite material, such as a seat having the advantages of the seat disclosed in the '490 and '747 patents, can be produced in a single mold. More specifically, the present foam composite material comprises two isocyanate-based polymer foams. The first isocyanate-based polymer foam has at least one uncontoured surface. The second isocyanate-based polymer foam is a mold foam. The first isocyanate-based polymer foam and the second isocyanate-based polymer foam are of different composition and are fixed with respect to one another.

Various terms of art are used throughout this specification. A discussion of the various terms is set out hereinbelow in order to provide context to the meaning of each term.

The term "uncontoured surface" is used in connection with a foam which, during expansion, is not constrained on at least one surface—i.e., those of skill in the art will recognize that this term can also be used in connection with a "free rise" foam but not a "molded" foam.

The term "molded foam" is used in connection with a foam which, during expansion and completion of gelation, is constrained on all surfaces—i.e., those skill in the art will recognize that this excludes "free rise" foams.

The term "rigid foam" is used in connection with a foam having an indentation force deflection at 25% deflection in the range of from about 150 to about 4,000 pounds when measured pursuant to ASTM 3574-$B_1$.

The term "resilient foam" is used in connection with a foam having an indentation force deflection at 25% deflection less than about 150 when measured pursuant to ASTM 3574-$B_1$.

The term "seat" is used in connection with one, some or all of a cushion (i.e., the portion of the seat on which the occupant sits), a back or back rest (i.e., the portion of the seat which supports the back of the occupant) and a side bolster (i.e., the extension of the back or the back rest). As is known in the automotive, airline and related industries, a "seat" includes both a cushion and a back (or backrest). Thus, as used herein, the term "seat" includes a cushion, a back (or back rest) or a unit construction comprising a cushion and a back (or backrest).

The term isocyanate-based polymer is used in connection with a polymer selected from the group comprising polyurethane, polyurea, polyisocyanurate, urea-modified polyurethane, urethane-modified polyurea, urethane-modified polyisocyanurate and urea-modified polyisocyanurate. As is known in the art, the term "modified", when used in conjunction with a polyurethane, polyurea or polyisocyanurate means that up to 50% of the polymer backbone forming linkages have been substituted.

One of the preferred applications of the present foam composite material is in vehicular applications, such as passenger seats, which will be described in greater detail hereinbelow with reference to the attached Figures. However those of skill in the art will immediately recognize other vehicular and non-vehicular applications for the present foam composite material. Non-limiting examples of other vehicular applications include headliners, head rests, door panels, instrument panels, arm-rests, luggage compartment trim panels, pillar covers, quarter panels, sail panels, package trays, glove box doors, console lids, air bag doors and the like. Non-limiting examples of non-vehicular applications include shoe soles, athletic equipment, furniture and the like. Further applications, both vehicular and non-vehicular, will be immediately apparent to those of skill in the art with this specification in hand.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
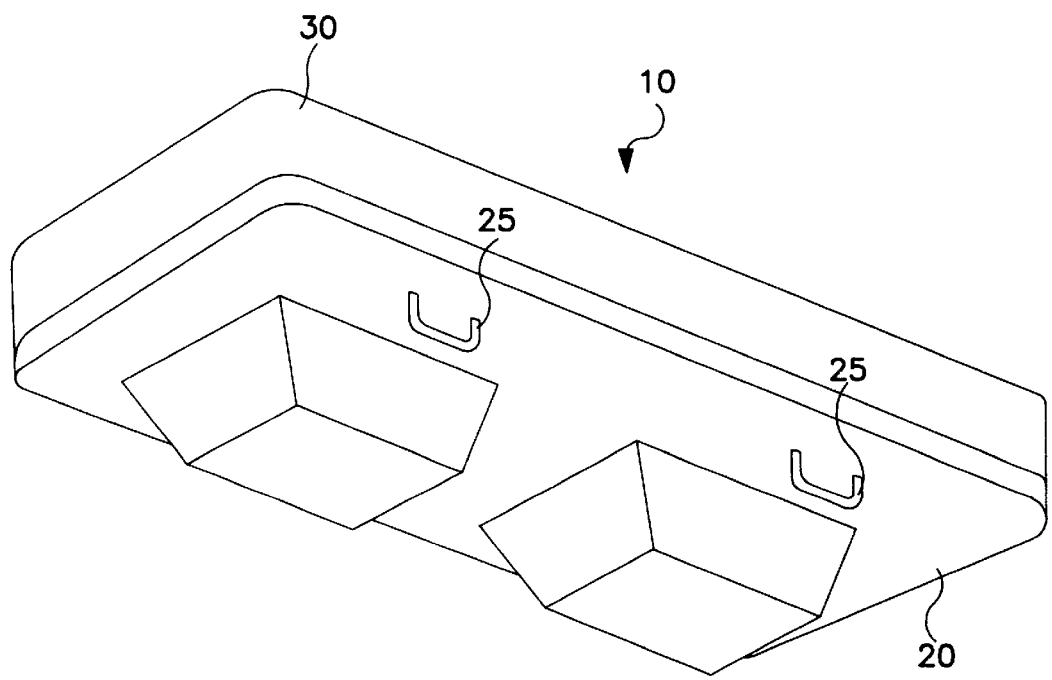
FIG. 1 illustrates a perspective view of an embodiment of the present foam composite material in the form of a seat.

With reference to FIG. 1, there is illustrated a passenger seat 10. Passenger seat 10 comprises a frame element 20. Embedded in frame element 20 are a pair of vehicle anchorage systems each of which comprise an embedded portion (see 27 in FIG. 2) and an anchorage ring 25. Frame element 20 may include a pelvic support (not shown). Frame element 20 is constructed of a relatively high density, rigid foam. Such a foam and the inclusion of a plevic support in frame element 20 is discussed in the '490 and '747 patents discussed above and incorporated herein by reference. Preferably, frame element 20 is constructed of a foam having an indentation force deflection at 25% deflection in the range of from about 150 to about 4000 pounds, more preferably from about 500 to about 2500 pounds, most preferably from about 900 to about 2000 pounds, when measured pursuant to ASTM 3574-$B_1$.

Preferably, frame element 20 is constructed of a polyurethane foam. More preferably, the polyurethane foam of frame element 20 preferably has a specific gravity of less than about 0.40, more preferably in the range of from about 0.10 to about 0.25. Preferably, the liquid foamable polyurethane composition used to produce frame element 20 has a free rise density of from about one to about twenty pounds per cubic foot, more preferably from about two to about eight pounds per cubic foot. For most molded foams, this would give use to a foam core having a density in the range of from about 1.5 to about 50 pcf, more preferably from about 2.5 to about 25 pcf.

Non-limiting and preferred examples of suitable polyurethane foams for use in producing frame element 20 are conventional rigid polyurethane foams. A particularly preferred class of rigid polyurethane foams will be discussed in more detail hereinbelow.

Passenger seat 10 further comprises a resilient body 30 which covers a surface of frame element 20. Resilient body 30 may be constructed of any material conventionally useful in the production of seats. The resilient body may be made of a foam or non-foam material. Non-limiting examples of useful non-foam materials include fibers matrices such as horse hair, organic fibers and the like. The resilient body may also be constructed of any suitable foam material. Ideally, the resilient body is constructed of a relatively low density, resilient foam, more preferably a polyurethane foam. Polyurethane foams useful for this purpose are well known in the art.

As will be developed hereinbelow, one of resilient body 30 and frame element 20 is a foam comprising at least one uncontoured surface (i.e., it is a free rise foam) whereas the other is a molded material (i.e., all surfaces are contoured).

Passenger seat 10 may further comprise a trim cover (not shown) which covers resilient body 30 and the periphery of frame element 20. The attachment of the trim cover to the frame element 20 may be achieved in accordance with the teachings of the '490 and '747 patents discussed above or in accordance with the teachings of copending U.S. patent application Ser. Nos. 08/706,427, 08/706,431, 08/706,432 and 08/706,433 (each naming Burchi et al. as applicants), the contents of each of which are hereby incorporated by reference.

Figure 2:
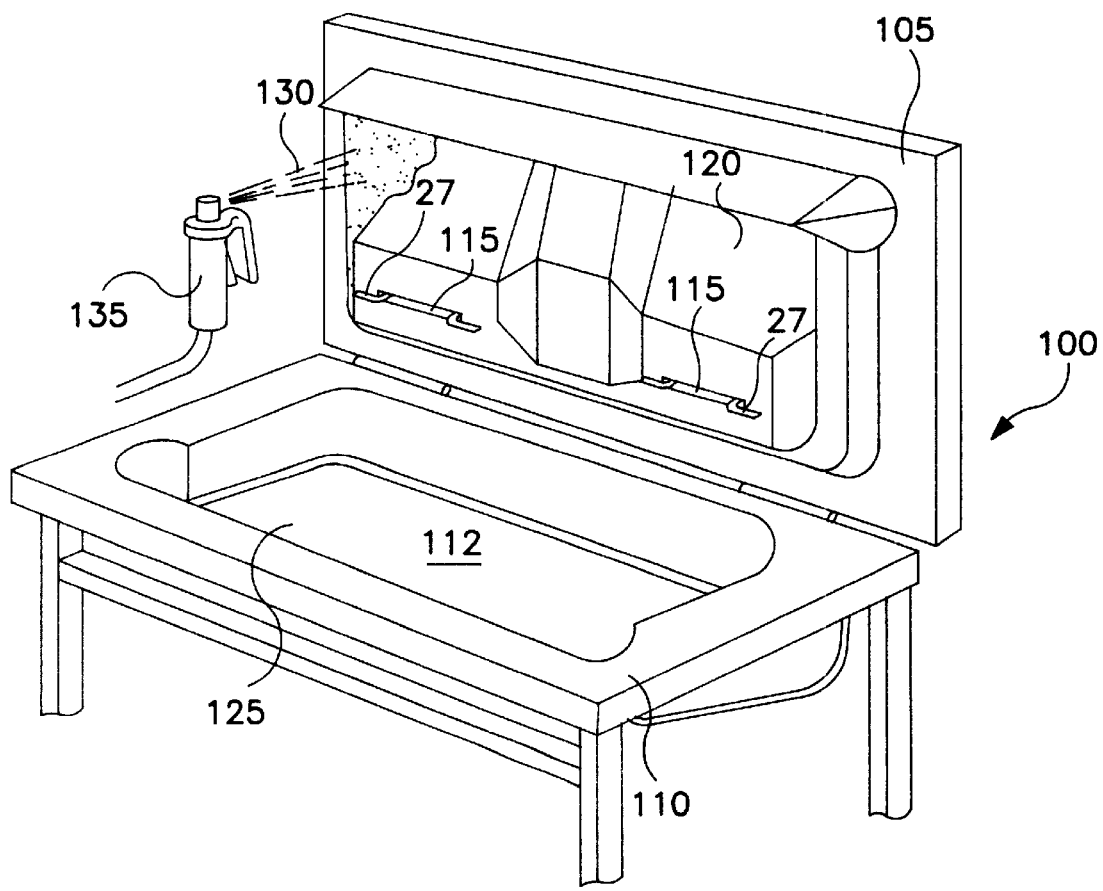
FIGS. 2–3 illustrate sequential steps of a first embodiment of the present process.
Figure 3:
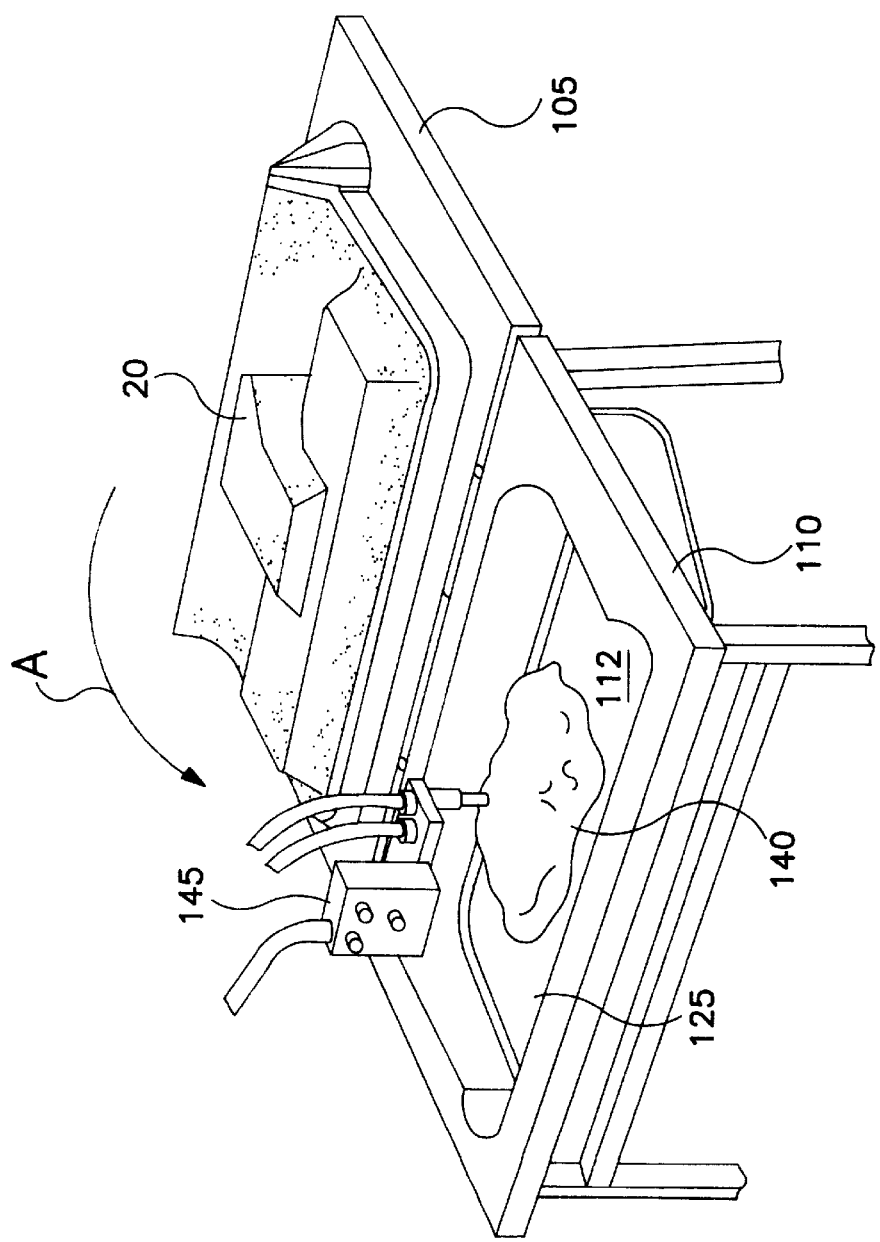

With reference to FIGS. 2 and 3, there are illustrated sequential steps in a preferred embodiment of the present process.

Thus, a clam shell mold 100 is provided and comprises a lid 105 and a bowl 110. Lid 105 and bowl 110 may be closed to define a cavity 112 having the overall desired shaped of the seat to be produced. Lid 105 is adapted to include a pair of apertures 115. Each aperture 115 receives anchorage ring 25 of each of the vehicle anchorage systems discussed hereinabove with reference to FIG. 1. Lid 105 is further adapted to provide a contoured surface 120 having the desired shape of the bottom of the seat (also known in the art as the "B surface" of the seat). As will be apparent, embedded portion 27 of each vehicle anchorage system is in a spaced relationship with respect to contoured surface 120. Bowl 110 is adapted to provide a contoured surface 125 having the desired shape of the top of the seat (also known in the art as the "A surface" of the seat).

Next, a first foamable composition 130 is dispensed onto contoured surface 120 from a spray head 135. First foamable composition 130 may be produced from the general formulation provided in Table 1.

TABLE 1

| Component | Amount |
| --- | --- |
| Polymer Polyol | 100–0 parts |
| Polyol | 0–100 parts |
| Crosslinker | 0–30 parts/100 parts total polyol |
| Catalyst | 0.05 to 5.0 parts/100 parts total polyol |
| Silicone Surfactants | 0–1.5 parts/100 parts total polyol |
| $H_2O$ | 0.5 to 3.5 parts/100 parts total polyol |
| Isocyanate | Adequate quantity for an index of from about 0.50 to 2.0 ratio of NCO equivalents to the equivalents of NCO reactive sites. |

In the illustrated embodiment, it is practical to formulate first foamable composition 130 to have a sufficient viscosity so that it expands very quickly thereby achieving the physical integrity needed to avoid run-off from contoured surface 120 of lid 105. This can be done by adapting the formulation provided in Table 1 to include: (i) a high amount of conventional metal catalyst, and/or (ii) an amine to take advantage of the fast "urea reaction" between an amine and an isocyanate. Alternatively, this can be done through the use of a one-component prepolymer or other partially-reacted system which is activated to complete the reaction by heat (e.g., from the mold) or other means upon being sprayed. Yet a further alternative is to adapt the formulation provided in Table 1 to include a rheological additive to promote thixotropic body. Examples of suitable such rheological additives include organic derivatives of castor oil, montmorillonite clay, alklaryl ammonium hectorite clay and the like.

Suitable polymer polyols, polyols and isocyanates are described in U.S. Pat. Nos. 3,304,273, 3,383,351, 3,523,093, 3,939,106 and 4,134,610, Belgian patent 788,115, Canadian Patent 785,835 and "Polymer/Polyols, a New Class of Polyurethane Intermediate", Kuryla, W. C. et al., J. Cellular Plastics, March (1966), the contents of which are hereby incorporated by reference. See also, "Flexible Polyurethane Foam" by Herrington et al. (1991), the contents of which are hereby incorporated by reference.

Suitable crosslinkers, catalysts and silicone surfactants are described in U.S Pat. Nos. 4,107,106 and 4,190,712, the contents of which are hereby incorporated herein by reference.

The preferred polyurethane foam suitable for use in first foamable composition illustrated in FIG. 1 may be produced from the formulation provided in Table 2.

TABLE 2

| Component | Amount |
| --- | --- |
| Polyol[1] | 80–95 parts |
| Amine[2] | 5–20 parts |
| Catalyst[3] | 0.5–2.0 parts/100 parts total polyol |
| Silicone Surfactants[4] | 0.5–2.5 parts/100 parts total polyol |
| $H_2O$ | 1.0–2.2 parts/100 parts total polyol |
| Isocyanate[5] | Adequate quantity for an index of from about 0.90 to 1.15 ratio of NCO equivalents to the equivalents of NCO reactive sites. |

[1]Includes a polyol, a polymer polyol and mixtures of these.
[2]Jeffamine ™ family available from Huntsman Corporation.
[3]Jeffcat ™ family available from Huntsman Corporation.
[4]Tegostab ™ family available from Goldschmidt.
[5]ICI Rubinate M.

Preferably, first foamable composition 130 is selected to substantially completely expand in less than about 10 seconds, preferably less than about 5 seconds, more preferably less that about 3 seconds.

Thus, as will be apparent from FIG. 2, as first foamable composition 130 is sprayed onto contoured surface 120 of lid 105, it immediately expands an achieves the physical integrity necessary for the expanded mass to remain on contoured surface 120 of lid 105. As will be further apparent, embedded portions 27 of the vehicle anchorage system become covered with and eventually embedded in the foam produced from foamable composition 130 (FIG. 3).

In some cases, it may be desirable to adapt lid 105 of mold 100 to include a temporary or permanent dam to obviate or mitigate overspray of foamable composition 130. Further, in some cases it may be desirable to shape first foamable composition 130 after it has been sprayed and expanded but before it has fully gelled.

Alternatively, it is possible to produce a preform of first foamable composition 130 away from contoured surface 120. This can be done by, for example, by spraying first foamable composition 130 on a form (not shown)having a contoured surface complementary to contoured surface 120 of lid 105 and thereafter expanding first foamable composition 130 to produce a preform of the first isocyanate-based polymer foam. Optionally, the form (not shown) may be adapted to include apertures for receiving the anchorage ring of each vehicle anchorage system discussed hereinabove. This preform of the first isocyanate-based polymer foam may than be placed on lid 105 to act as frame 20.

FIG. 3 illustrates the point in the process after which frame element 20 has been produced. As will be apparent to those of skill in the art, the only contoured surface in frame element 20 is the one in contact with contoured surface 120 of lid 105—i.e., the other surfaces of frame element 20 are uncontoured. Thus, those of skill in the art will recognize that frame element 20 is a "free-rise" (i.e., unmolded) foam. In some cases, the major uncontoured surfaces of frame element 20 may have a skinned and/or dimpled appearance which improves ultimate adhesion to the resilient foam.

With further reference to FIG. 3, a second foamable composition 140 is dispensed from a mixing head 145 into bowl 110 of mold 100. Preferably, foamable composition 140 is a polyurethane composition formulated to provided a relatively low density, resilient polyurethane foam. Such foams are conventional and use thereof in the automotive seating industry is well known. Accordingly, the form of liquid foamable polymeric composition 140 suitable for use herein and the manner by which it is dispensed into bowl 110 is not particularly restricted. Preferably, the foamable polymeric composition comprises a polyurethane derived from a diphenylmethane diisocyanate (MDI)-based system of low index and of a high molecular weight conventional polyol. Such a system is typically completely "water blown" using highly-catalysed odourless amines and a cell regulator. Alternatively, the system can be blown directly with $CO_2$ (e.g., liquid or solid $CO_2$) and/or an organic blowing agent (e.g., pentane, HCFC's and the like). Typically, this system cures at room temperature in about 3 minutes or less. Alternatively, the polyurethane is a toluene diisocyanate (TDI)-based system of low index and of a high molecular weight conventional polyol. When such a TDI-based system is used, the cells of the foam in the finished padded element must be substantially open. Opening of such foam cells is within the purview of a person skilled in the art and can be accomplished by any convenient means such as crushing, kneading, roll pressing, chemical treatment and the like of the padded element while ensuring that the trim cover is not damaged during this step. It will be appreciated that the liquid foamable polymeric composition may comprise a mixture of MDI-based and TDI-based systems.

After second foamable composition 140 is dispensed into bowl 110, lid 105 is swung in the direction of arrow A to effect closing of mold 100. Once mold 100 is closed, second foamable composition expands to fill the remainder of cavity 112 (i.e., that portion of cavity 112 not occupied by frame element 20) thereby producing foam body 30 which is bonded to frame element 20. Thus, as will be apparent to those of skill in the art foam body 30 is a molded foam having surfaces which are contoured during expansion by a combination of bowl 110 of mold 100 and frame 20 affixed to lid 105 of mold 100. Once foam body 30 has cured, mold 100 may be opened and seat 10 may be demolded in a conventional manner.

A particular advantage of the process illustrated in FIGS. 2–3 is the improved degree of control achieved by spraying first foamable composition 130 as compared to relying on flow of the liquid composition to produce a uniform frame element. This allows for the production of a relatively thin frame element (e.g., from about 1 to about 4 inches thick).

Thus, to summarize, the embodiment of the present process illustrated in FIGS. 2–3, results in the production of a foam composite material in the form of a seat wherein the rigid foam frame of the seat has at least one uncontoured surface (i.e., the frame is a "free-rise" foam) and the seat body is a molded, resilient foam.

Within the scope of the present process, it is possible to produce a foam composite material in the form of a seat wherein the rigid foam frame of the seat is molded and the seat body is a resilient foam having at least one uncontoured surface (i.e., the body is a "free-rise" foam). This embodiment will now be described with reference to FIGS. 4–9.

The embodiment of the present process illustrated in FIGS. 4–9 may be carried out using the same mold 100 and mixing head 145 illustrated in FIGS. 2–3.

Figure 4:
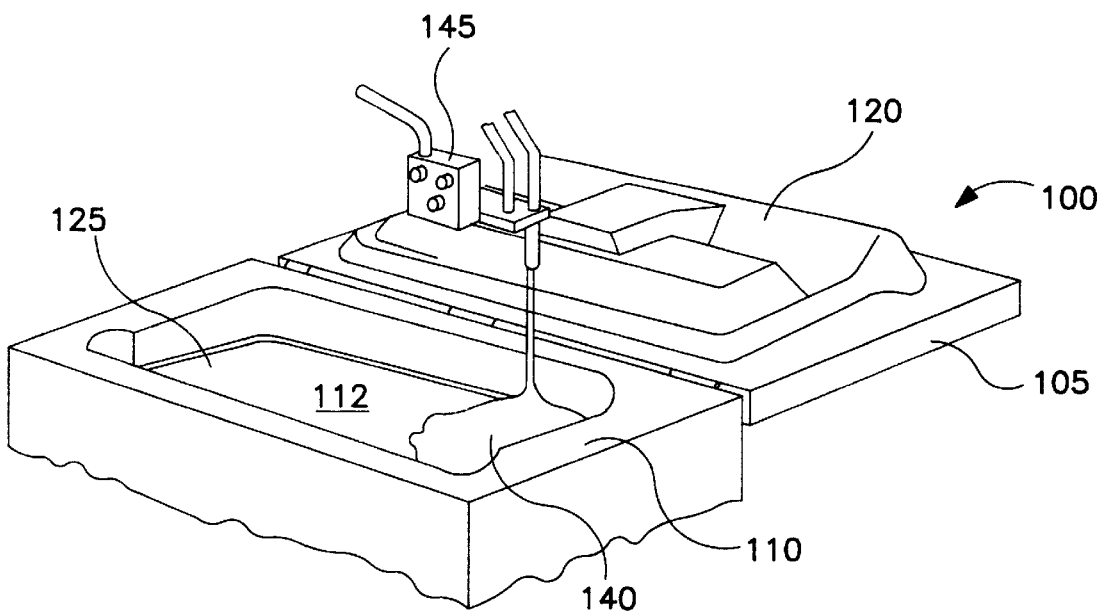
FIGS. 4–9 illustrate sequential steps of a second embodiment of the present process.
Figure 5:
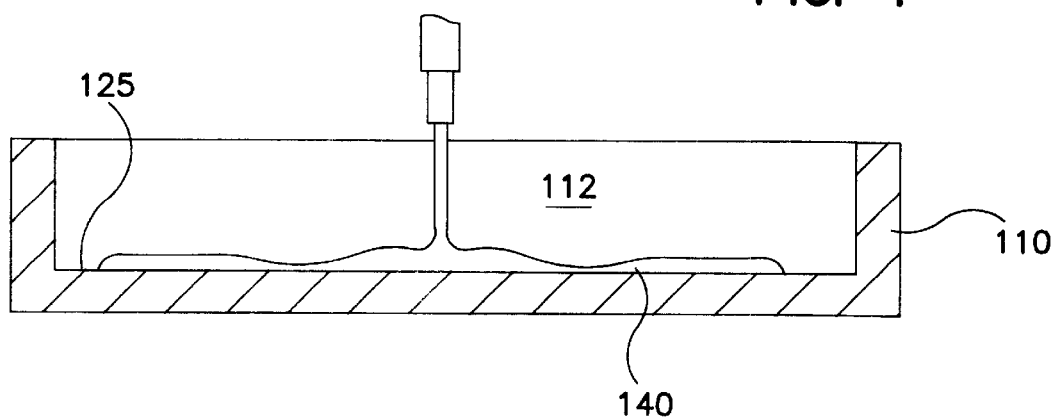
Figure 6:
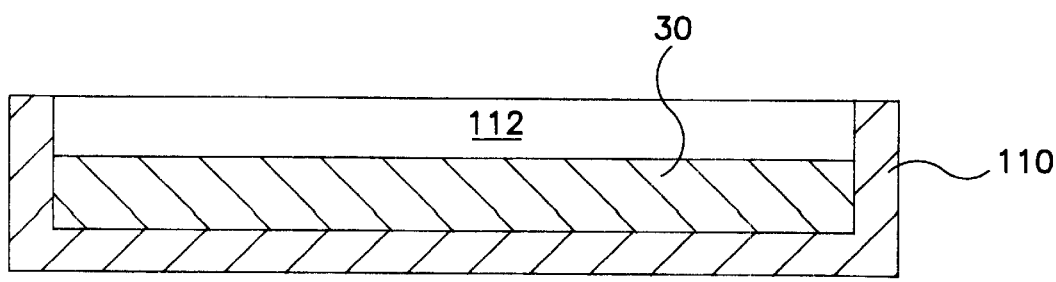
Figure 7:
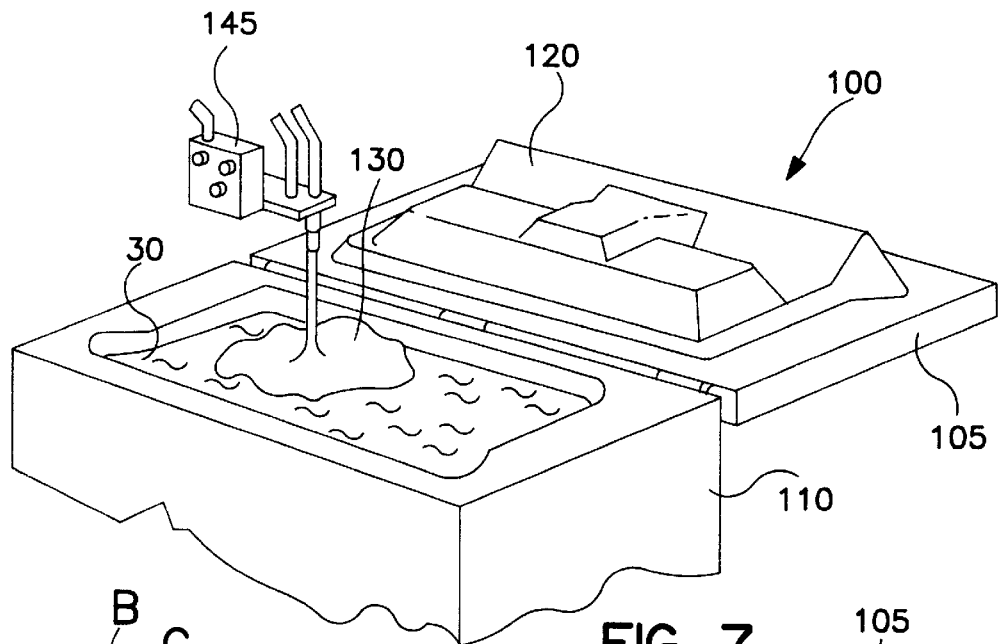

Thus, with references to FIGS. 4 and 5, second foamable composition 140 is dispensed in to bowl 10 using mixing head 145. Foamable composition 140 is then allowed to expand to partially fill cavity 112. With reference to FIGS. 6 and 7, once foamable composition 140 has reached an expansion point and gelation point whereby has sufficient physical integrity, first foamable composition 130 is dispensed thereon using mixing head 145. In this embodiment, it is not as practically important (i.e., compared to the embodiment illustrated in FIGS. 2–3) to formulate foamable composition 130 to achieve very fast expansion and gelation since mold run-off is not a potential issue in this embodiment.

Figure 8:
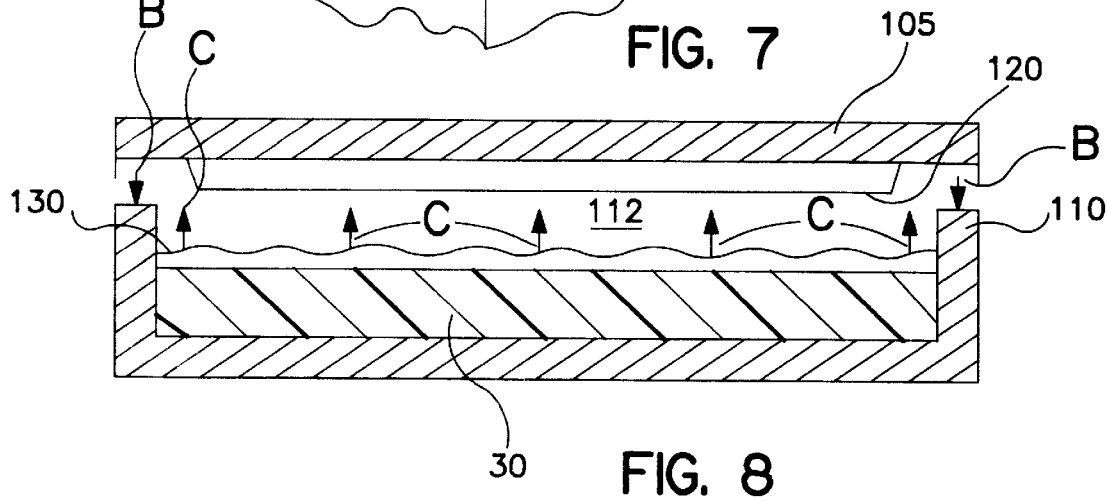
Figure 9:
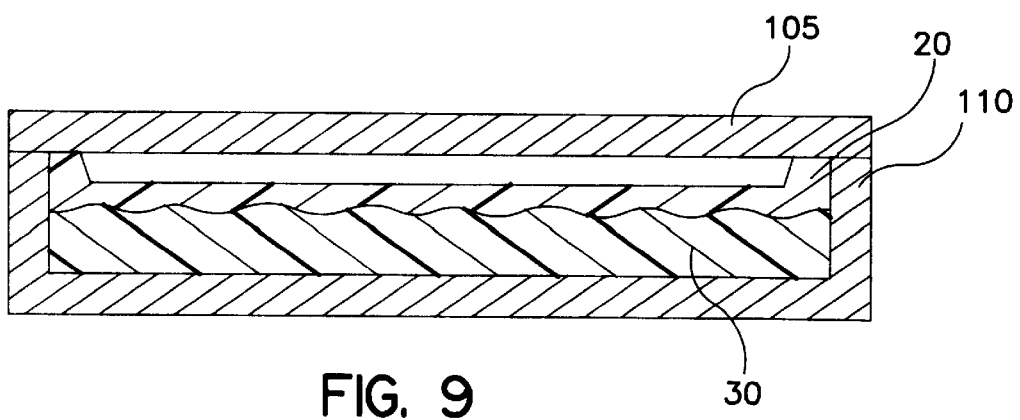

With reference to FIG. 8, after first foamable composition 130 is dispensed, mold 100 is closed in the direction of arrows B. During and after mold closure, first foamable composition 130 expands substantially toward lid 105 of mold 100 in the direction of arrows C (i.e., away from resilient body 30 which was formed from second foamable composition 140) to fill the remainder of cavity 112 (i.e., that portion of cavity 112 not occupied by resilient body 30) thereby producing frame element 20 which is bonded to frame element 30. Thus, as will be apparent to those of skill in the art, frame element 20 is a molded foam having surfaces which are contoured during expansion by a combination of lid 105 of mold 100 and resilient body 30 in bowl 110 of mold 100. Once frame element 20 has cured, mold 100 may be opened and seat 10 may be demolded in a conventional manner.

Thus, to summarize, the embodiment of the present process illustrated in FIGS. 4–9, results in the production of a foam composite material in the form of a seat wherein the resilient body of the seat has at least one uncontoured surface (i.e., the resilient body is a "free-rise" foam) and the frame element is a molded, rigid foam.

In the illustrated process embodiments, the seat product, in each case, does not have an exposed uncontoured surface. In other words, the exterior of the foam composite material in the form a seat is made up of molded surfaces only.

Optionally, the present process can be combined with conventional "foam in-place" processes which serve to bond resilient body 30 to a trim cover at the upper surface of seat 10. This would supplement attachment of the trim cover to frame element 20. See for example the '490 and '747 patents, and the Burchi et al. copending applications, discussed above and incorporated herein by reference, and U.S. Pat. No. 5,132,063 [Hughes], the contents of which are hereby incorporated by reference.

Preferably resilient body 30 is bonded to frame element 20. However, it is possible to a trim cover to mechanically secure resilient body 30 with respect to frame element 20. Optionally, such trim cover attachment can be supplemented by bonding the trim cover to resilient body 30—see, for example, U.S. Pat. Nos. 5,089,191 [Hughes] and 5,096,639 [Hughes], the contents of each of which are hereby incorporated by reference.

While specific embodiments of the embodiment of the present foam composite material in the form of a seat has been described hereinabove, those of skill in the art will recognize that a number of modifications and variations are possible without departing from the spirit and scope of this embodiment of the invention.

Still further, it is possible to produce the seat with or without at least one pelvic support element connected to the frame element. If the pelvic support element is to be used, it is preferred that it be integrally molded with the foam frame element. Further, it is preferred that the vehicle attachment wire (or other means) be molded into the frame element.

Still further, it is contemplated that, in certain applications it is desirable that the underside (i.e., the side of the seat opposite the trim cover) of the seat have structural properties (i.e., able to bend but not break) properties. This is especially desirable if the passenger seat is to be used in a seat back application which is devoid of a metal frame. In such an application, the design challenge is to mitigate the occurrence of projection of heavy articles in the trunk of a vehicle through the rear passenger seat (i.e., the seat back) upon impact of the vehicle. In such cases, it may be desirable and preferred to incorporate a reinforcing layer on one or both of the major surfaces of the foam frame element.

The choice of reinforcing layer is not particularly restricted and may be a non-metal or a metal. Preferably, the reinforcing layer is flexible and, more preferably, permeable (i.e., to air, water, etc.). The flexible reinforcing layer may be fibrous or non-fibrous. Non-limiting examples of fibrous reinforcing layers include at least one member selected from the group consisting essentially of glass fibers (e.g., in the form of a cloth or a mat, chopped or unchopped, such as Nico 754 1 oz/ft$^2$), polyester fibers, polyolefin fibers (e.g., polyethylene and polypropylene), Kevlar fibers, polyamides fibers (e.g., nylon), cellulose fibers (e.g., burlap), carbon fibers, cloth materials such spun bound polyesters (e.g., Lutravil 1DH7210B/LDVT222 and Freudenberg PTLD585G/PTLD600B) and paper (e.g., Kraft#60). It will be appreciated that the fibrous reinforcing layer may be woven or non-woven. Non-limiting examples of a non-fibrous reinforcing layer comprise at least one member selected from the group consisting essentially of thermosets (e.g., polyurethanes, polyesters and epoxies), metals such as aluminum foil, polycarbonates (e.g., Lexan and Dow Calibre), polycarbonate/ABS alloys (e.g., Dow Pulse), ABS terpolymers (e.g., Royalite 59 and Dow Magnum), polyester terphthalate (PET), vinyl, styrene maleic anhydride (e.g., Arco Dylark), and fibreglass reinforced polypropylene (e.g., Azdel). It will be appreciated that many non-fibrous reinforcing layer materials may themselves be reinforced with fibrous materials and thus, the flexible reinforcing layer may be a combination of fibrous and non-fibrous materials, either mixed or composite in construction. The manner of incorporating a reinforcing layer on a polyurethane foam such as the one used in frame element 20 is disclosed, inter alia, in U.S. Pat. No. 5,389,316 [Kerman], the contents of which are hereby incorporated by reference.

Other modifications and variations within the scope and spirit of the invention will be apparent to those of skill in the art.

For example, as discussed above, while the specific embodiments of the invention illustrated in the Figures is in connection with a vehicular seat, the present foam composite material can be used in many other vehicular and non-vehicular applications.

Another vehicular application of the present foam composite material is in the production of door trim panels. In this application, it is particularly preferred to initially spray the bowl with a conventional paint composition and utilize for second foamable composition 140 a formulation which results in the production of a skinned polyurethane foam—see, for example copending U.S. patent application Ser. No. 08/604,071 (Kuczynski), filed on Feb. 20, 1996, the contents of which are hereby incorporated by reference. Examples of other vehicular applications of the present foam composite include: quarter trim panels, sale panels, package trays, glove box doors console lids, air bag doors and the like. As will be appreciated by those of skill in the art, in some or all of these various vehicular applications of the present foam composite material, a vehicle anchorage system will be incorporated in the rigid foam to facilitate mounting of the foam composite material in the vehicle.

A particularly preferred non-vehicular application of the present foam composite material is in the form of shoe soles (e.g., laminate shoe soles), athletic equipment, furniture and the like In yet a further modification of the specific embodiments discussed hereinabove, it is possible to select relative resiliency of the first isocyanate-based polymer foam and the second isocyanate-based polymer foam in the present foam composite to improve vibration dampening of the composite. This is particularly useful in vehicular seat applications of the present foam composite material thereby improving the comfort of the seat.

Other variations and modifications of the specific embodiments described hereinabove which do not depart from the scope and spirit of the invention will be immediately apparent to those of skill in the art having this specification in hand.

What is claimed is:

1. A foam composite material comprising a first isocyanate-based polymer foam comprising at least one uncontoured surface and a second, molded isocyanate-based polymer foam, the first isocyanate-based polymer foam and the second isocyanate-based polymer foam being: (i) of different composition, and (ii) fixed with respect to one another at the at least one uncontoured surface of the first isocyanate-based polymer foam.

2. The foam composite material defined in claim 1, wherein the second, molded isocyanate-based polymer foam is a resilient foam.

3. The foam composite material defined in claim 1, wherein the second, molded isocyanate-based polymer foam is a resilient polyurethane foam.

4. The foam composite material defined in claim 1, wherein at least one of the first isocyanate-based polymer foam and the second isocyanate-based polymer foam are flexible.

5. The foam composite material defined in claim 1, wherein both of the first isocyanate-based polymer foam and the second isocyanate-based polymer foam are flexible.

6. The foam composite material defined in claim 1, wherein the first isocyanate-based polymer foam is a rigid foam.

7. The foam composite material defined in claim 1, wherein first isocyanate-based polymer foam is a rigid polyurethane foam.

8. The foam composite material defined in claim 7, wherein the polyurethane foam has an indentation force deflection at 25% deflection in the range of from about 150 to about 4,000 pounds when measured pursuant to ASTM 3574-$B_1$.

9. The foam composite material defined in claim 7, wherein the polyurethane foam has an indentation force deflection at 25% deflection in the range of from about 500 to about 2,500 pounds when measured pursuant to ASTM 3574-$B_1$.

10. The foam composite material defined in claim 7, wherein the polyurethane foam has an indentation force deflection at 25% deflection in the range of from about 900 to about 2,000 pounds when measured pursuant to ASTM 3574-$B_1$.

11. The foam composite material defined in claim 1, wherein the first isocyanate-based polymer foam is a resilient foam.

12. The foam composite material defined in claim 1, wherein the first isocyanate-based polymer foam is a resilient polyurethane foam.

13. The foam composite material defined in claim 1, wherein the first isocyanate-based polymer foam is adhered to the second isocyanate-based polymer foam.

14. The foam composite material defined in claim 1, wherein the first isocyanate-based polymer foam comprises at least one exposed contoured surface.

15. The foam composite material defined in claim 1, wherein the at least one-uncontoured surface of the first isocyanate-based polymer foam is adhered to the second isocyanate-based polymer foam.

16. A vehicular interior trim panel comprising the foam composite material defined in claim 1.

17. A passenger seat comprising the foam composite material defined in claim 1, wherein one of the first isocyanate-based polymer foam and the second isocyanate-based polymer foam is a rigid foam.

18. The passenger seat defined in claim 17, wherein the first isocyanate-based polymer foam is a rigid foam.

19. The passenger seat defined in claim 17, further comprising at least one pelvic support element connected to the rigid foam.

20. The passenger seat defined in claim 19, wherein the at least one pelvic support element is integrally molded with rigid foam.

21. The passenger seat defined in claim 17, further comprising vehicle anchorage means embedded in the rigid foam.

22. The passenger seat defined in claim 21, wherein the vehicle anchorage meas includes an anchor portion to engage a portion of a vehicle and an attachment portion embedded in the rigid foam.

23. The passenger seat defined in claim 17, further comprising a trim cover.

24. The passenger seat defined in claim 23, wherein the trim cover comprises connection means for attaching the trim cover to the rigid foam.

25. A process for producing a foam composite material in a mold comprising a first mold half and a second mold half engageable to define a mold cavity, the process comprising the steps of:
   (i) providing a first isocyanate-based polymer foam having at least one uncontoured surface in the first mold half;
   (ii) dispensing a second foamable composition in at least one of the first mold half and the second mold half;
   (iii) closing the first mold half and the second mold half;
   (iv) expanding the second foamable polymeric composition to fill substantially the mold cavity to produce a second isocyanate-based molded polymer foam;
   (v) fixing the second isocyanate-based polymer foam with respect to the first isocyanate based foam to produce the foam composite.

26. The process defined in claim 25, wherein the second, molded isocyanate-based polymer foam is a resilient foam.

27. The process defined in claim 25, wherein the second, molded isocyanate-based polymer foam is a resilient polyurethane foam.

28. The process defined in claim 25, wherein at least one of the first isocyanate-based polymer foam and the second isocyanate-based polymer foam are flexible.

29. The process defined in claim 25, wherein both of the first isocyanate-based polymer foam and the second isocyanate-based polymer foam are flexible.

30. The process defined in claim 25, wherein the first isocyanate-based polymer foam is a rigid foam.

31. The process defined in claim 25, wherein first isocyanate-based polymer foam is a rigid polyurethane foam.

32. The process defined in claim 31, wherein the first isocyanate-based polymer foam has an indentation force deflection at 25% deflection in the range of from about 150 to about 4,000 pounds when measured pursuant to ASTM 3574-$B_1$.

33. The process defined in claim 31, wherein the first isocyanate-based polymer foam has an indentation force deflection at 25% deflection in the range of from about 500 to about 2,500 pounds when measured pursuant to ASTM 3574-$B_1$.

34. The process defined in claim 31, wherein the first isocyanate-based polymer foam has an indentation force deflection at 25% deflection in the range of from about 900 to about 2,000 pounds when measured pursuant to ASTM 3574-$B_1$.

35. The process defined in claim 25, wherein Step (v) comprises adhering the at least one-uncontoured surface of the first isocyanate-based polymer foam to the second isocyanate-based polymer foam.

36. The process defined in claim 25, wherein Step (i) comprises spraying a first foamable composition on the first mold half and expanding the first foamable composition to produce the first isocyanate-based polymer foam.

37. The process defined in claim 25, wherein Step (ii) comprises dispensing the second foamable polymeric composition in the second mold half.

38. The process defined in claim 25, wherein Step (ii) comprises dispensing the second foamable polymeric composition on the first isocyanate-based polymer foam in the first mold half.

39. The process defined in claim 25, wherein Step (i) comprises placing a preformed first isocyanate-based polymer foam having at least one uncontoured surface in the first mold half.

40. The process defined in claim 25, wherein the preformed first isocyanate-based polymer foam is produced by the steps of:
   spraying a first foamable composition on a form having a contoured complementary to the first mold; and
   expanding the first foamable composition to produce the preformed first isocyanate-based polymer foam.

* * * * *